(12) United States Patent
Kato (10) Patent No.: US 6,975,498 B2
(45) Date of Patent: Dec. 13, 2005

(54) VARIABLE CAPACITOR

(75) Inventor: Wataru Kato, Fukui (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/788,058

(22) Filed: Feb. 27, 2004

(65) Prior Publication Data

US 2004/0257746 A1 Dec. 23, 2004

(30) Foreign Application Priority Data

Jun. 20, 2003 (JP) .............................. 2003-176090

(51) Int. Cl.[7] .............................................. H01G 5/00
(52) U.S. Cl. ...................... 361/277; 361/278; 361/280; 361/281; 361/283.1; 361/290; 361/291
(58) Field of Search ................................ 361/277, 278, 361/279, 298.1, 298.2, 298.3, 290, 293, 272, 361/283.1, 291

(56) References Cited

U.S. PATENT DOCUMENTS

| 4,112,480 A | 9/1978 | Johanson et al. |
| 5,424,906 A * | 6/1995 | Kishishita et al. ........ 361/298.1 |
| 6,226,168 B1 * | 5/2001 | Shibata ....................... 361/277 |
| 6,353,527 B2 * | 3/2002 | Kinoshita et al. ............ 361/277 |
| 6,625,858 B2 * | 9/2003 | Kishishita et al. .......... 29/25.42 |

FOREIGN PATENT DOCUMENTS

JP 10-233338 9/1998

* cited by examiner

*Primary Examiner*—Nguyen T. Ha
(74) *Attorney, Agent, or Firm*—Keating & Bennett, LLP (57) ABSTRACT

A variable capacitor includes a stator and a rotor rotatably supported by a cover relative to the stator. The stator includes a first stator electrode of two or more layers and a second stator electrode of two or more layers in the interior of a dielectric substrate. The first stator electrode is connected to a first external electrode and the second stator electrode is connected to a second external electrode. The rotor includes a rotor electrode of two pieces opposing the stator electrodes, and capacitances are defined in the areas of overlap of the rotor electrode and stator electrodes. The capacitances are adjustable to extremely small levels.

11 Claims, 9 Drawing Sheets

VARIABLE CAPACITOR

BACKGROUND OF THE INVENTION

1. Field of the Invention

The present invention relates to a variable capacitor and, in particular, to a variable capacitor having a stator and a rotor that is rotatably supported relative to the stator, in which rotation of the rotor changes the area of overlap of a stator electrode and a rotor electrode so as to change the capacitance.

2. Description of the Related Art

Variable capacitors in which rotation of a rotor having a rotor electrode changes the area of overlap of a stator electrode in a stator and the rotor electrode to change their capacitance are disclosed in Japanese Unexamined Patent Application Publication No.10-233338 (hereinafter referred to as Patent Document 1) and U.S. Pat. No. 4,112,480 (hereinafter referred to as Patent Document 2).

Figure 8:
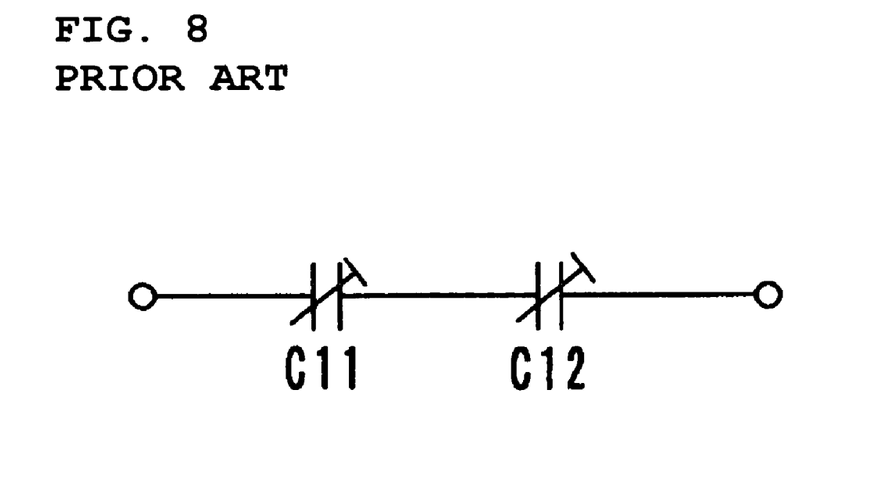
FIG. 8 is a diagram of the equivalent circuit of a first example of a known variable capacitor.

FIG. 8 shows the equivalent circuit of the variable capacitor disclosed in Patent Document 1. Rotation of a single rotor changes two capacitances C11 and C12. The variable capacitor is designed so that each capacitance C11 or C12 has a minimum value and a maximum value during one rotation of the rotor.

Unfortunately, in such a capacitor, the capacitances C11 and C12, which are connected in series, disadvantageously increase a resistance (ESR) resulting from a resistive component induced in the stator electrode.

Figure 9:
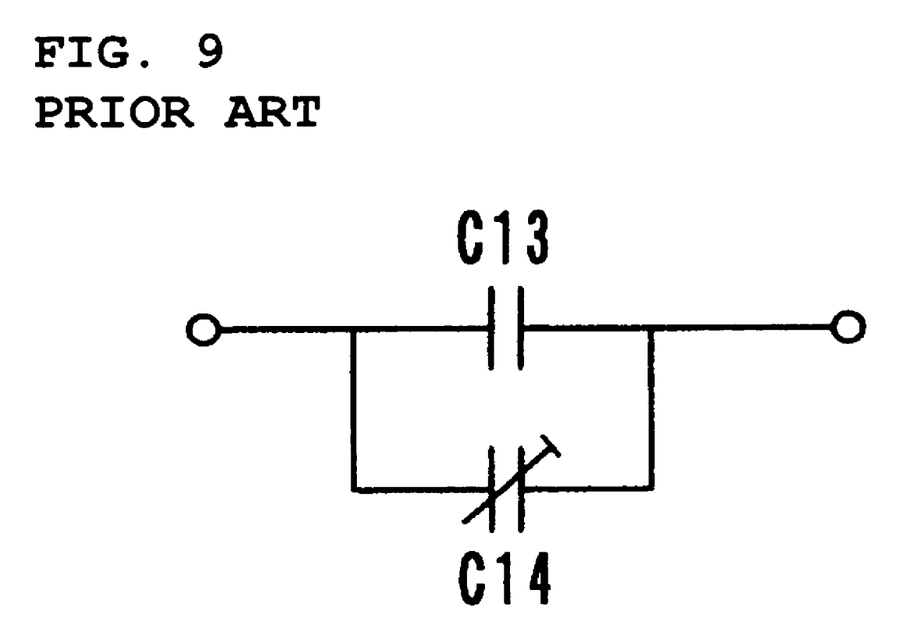
FIG. 9 is a diagram of the equivalent circuit of a second example of a known variable capacitor.

On the other hand, Patent Document 2 discloses a variable capacitor in which layers of stator electrodes are disposed in a dielectric substrate and, as shown in the equivalent circuit in FIG. 9, one fixed capacitance C13 is connected in parallel to one variable capacitance C14. This variable capacitor can reduce a resistance (ESR) resulting from a resistive component induced in the stator electrode.

Unfortunately, in this variable capacitor, the value of the capacitance C13 is fixed, and therefore, the fixed capacitance C13 determines the lowest value of the overall capacitance. As a result, the capacitance of the variable capacitor cannot be adjustable to an extremely small value or zero. That is, the variable capacitor has a low self-oscillation frequency, thus making it difficult to operate in a high frequency range.

SUMMARY OF THE INVENTION

In order to overcome the problems described above, preferred embodiments of the present invention provide a variable capacitor having a reduced resistance (ESR) and being adjustable to an extremely small overall capacitance.

According to a preferred embodiment of the present invention, a variable capacitor includes a stator and a rotor rotatably supported relative to the stator. The stator includes a first external electrode and a second external electrode disposed on a dielectric substrate, a first stator electrode connected to the first external electrode, and a second stator electrode connected to the second external electrode in the interior of the dielectric substrate. The rotor includes a rotor electrode. Each of the first and the second stator electrodes includes a plurality of conductor layers and thereby capacitances are defined by the areas of overlap of the conductor layers and the rotor electrode.

In the variable capacitor, the first stator electrode and the rotor electrode define an equivalent circuit of a plurality of parallel-connected variable capacitors, the second stator electrode and the rotor electrode define an equivalent circuit of a plurality of parallel-connected variable capacitors, and the parallel-connected variable capacitors are connected in series with each other.

That is, since the first and the second stator electrodes are connected in parallel with each other, a resistance (ESR) resulting from a resistive component induced in the stator electrodes is reduced. In addition, each of the parallel-connected capacitors is variable so that the overall capacitance is adjustable to an extremely small value or zero. Accordingly, the variable capacitor has a high self-oscillation frequency and can operate in a high frequency range.

Preferably, in the variable capacitor, the rotor electrode passes through the positions where the area of overlap of the rotor electrode and the stator electrode alternately has a minimum value and a maximum value for every 90 degree rotation of the rotor. This design can determine the maximum value and the minimum value capacitances most efficiently.

Other features, elements, characteristics and advantages of the present invention will become more apparent from the following detailed description of preferred embodiments with reference to the attached drawings.

BRIEF DESCRIPTION OF THE DRAWINGS

FIG. 1 shows an external view of a variable capacitor according to a first preferred embodiment of the present invention, where

FIG. 3 shows a stator of the variable capacitor according to the first preferred embodiment, where

FIG. 4 shows a rotor of the variable capacitor according to the first preferred embodiment, where

FIG. 6 shows a stator of a variable capacitor according to a second preferred embodiment of the present invention, where

DETAILED DESCRIPTION OF PREFERRED EMBODIMENTS

Preferred embodiments of a variable capacitor in accordance with the present invention will now be described with reference to the accompanying drawings.

First Preferred Embodiment (FIGS. 1 to 5)

Figure 1A:
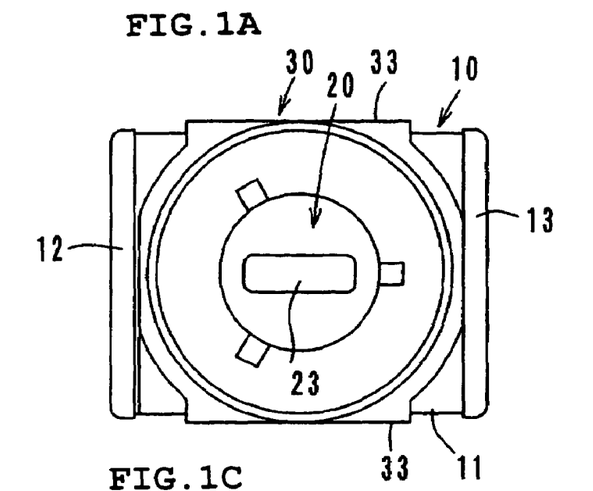
FIG. 1A is a plan view.
Figure 1B:
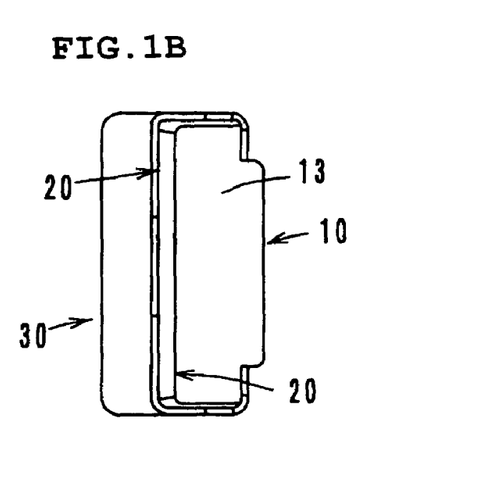
FIG. 1B is a side elevation view.
Figure 1C:
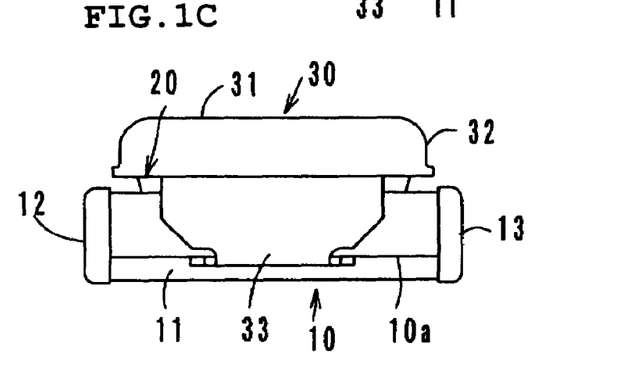
FIG. 1C is a front view.
Figure 1D:
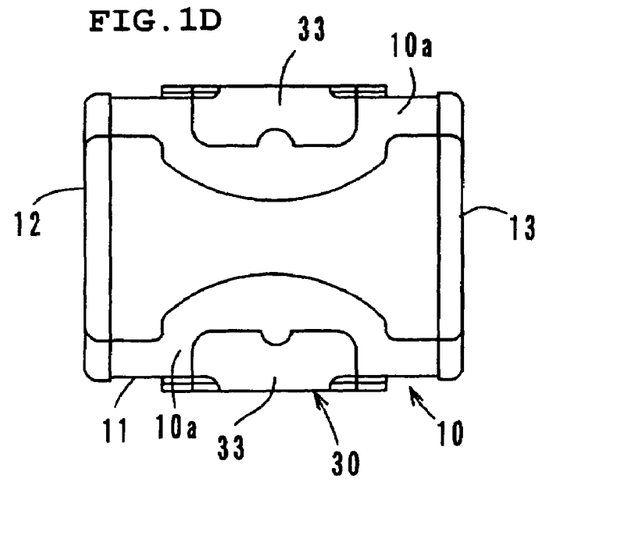
FIG. 1D is a bottom view.
Figure 2:
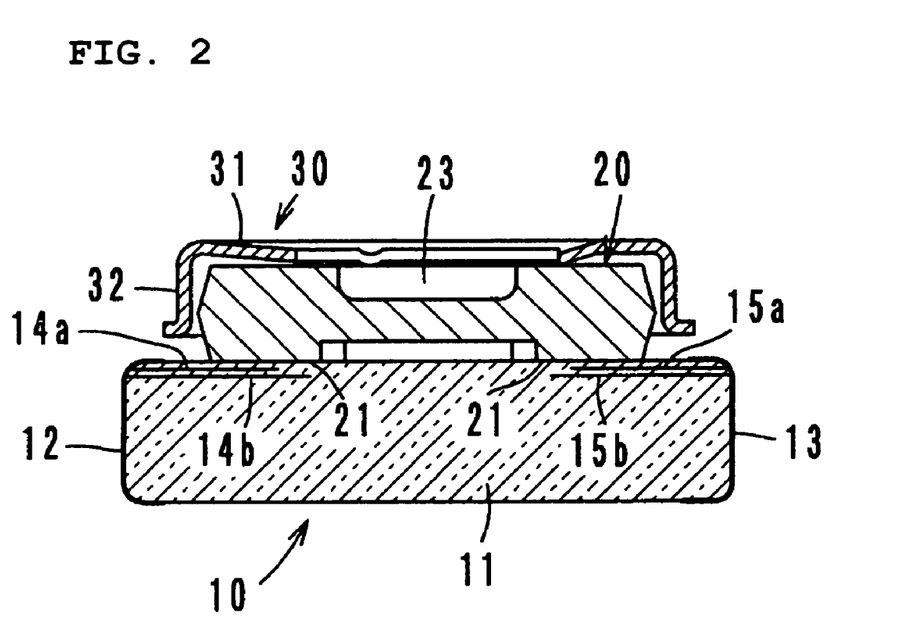
FIG. 2 is a sectional view of the variable capacitor according to the first embodiment preferred of the present invention.

With reference to FIGS. 1 and 2, a variable capacitor according to a first preferred embodiment includes a stator 10, a rotor 20, and a cover 30. The rotor 20 is disposed on the stator 10 with their centers aligned and is rotatably supported by an upper segment 31 and a side segment 32 of the cover 30. The cover 30 has two leg segments 33, each extending along a side of the stator 10 and gripping dents 10a in the bottom of the stator 10 so that the stator 10 and the rotor 20 are integrated into one unitary body.

Figure 3A:
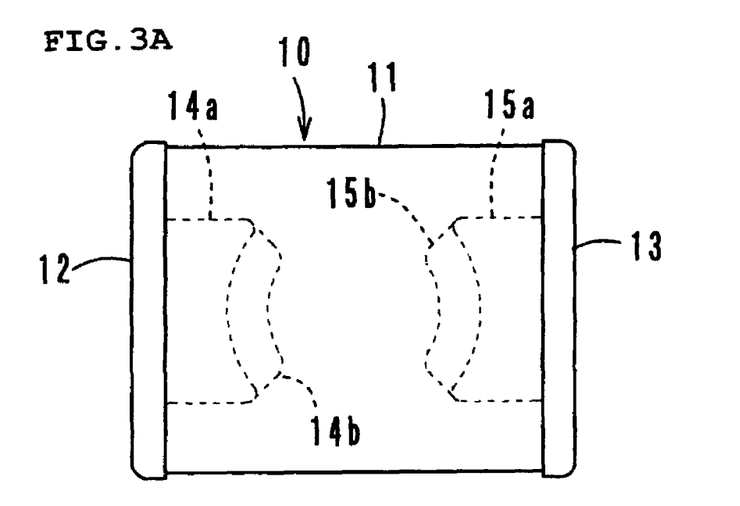
FIG. 3A is a plan view.
Figure 3B:
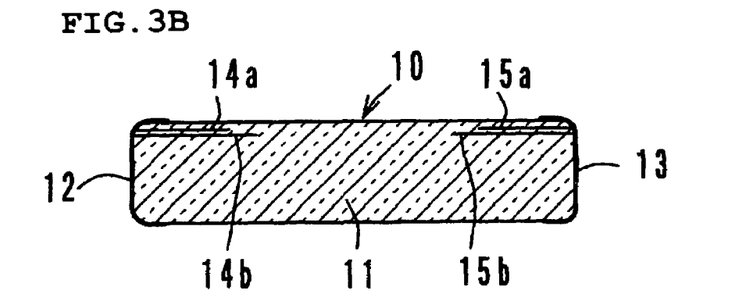
FIG. 3B is a sectional view.
Figure 3C:
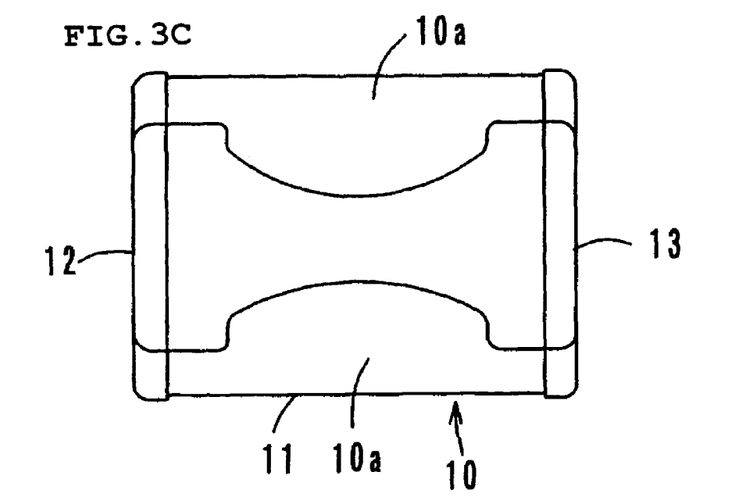
FIG. 3C is a bottom view.

With reference to FIG. 3, the stator 10 includes a dielectric substrate 11, which is made from laminated dielectric sheets (ceramic green sheets). On two opposing sides of the substrate 11, a first external electrode 12 and a second external electrode 13 are respectively disposed. In the interior of the substrate 11, a first stator electrode including two layers 14a and 14b and a second stator electrode including two layers 15a and 15b are disposed. The first stator electrode and the second stator electrode are connected to the first external electrode 12 and the second external electrode 13, respectively. The stator electrode layers 14a, 14b, 15a, and 15b are formed by applying a material for the electrodes onto the respective ceramic green sheets in predetermined shapes (refer to FIG. 3A).

Compared with the upper layers of stator electrodes 14a and 15a, the lower layers of the stator electrodes 14b and 15b are formed in relatively wide areas.

Figure 4A:
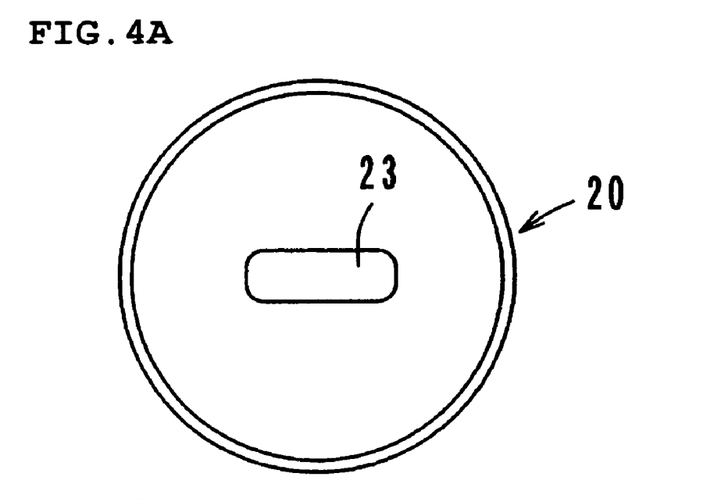
FIG. 4A is a plan view.
Figure 4B:
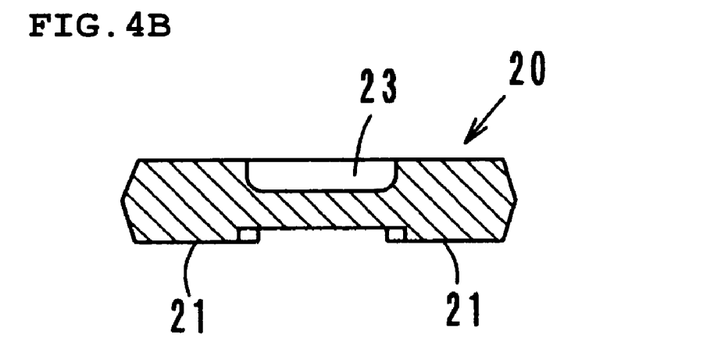
FIG. 4B is a sectional view.
Figure 4C:
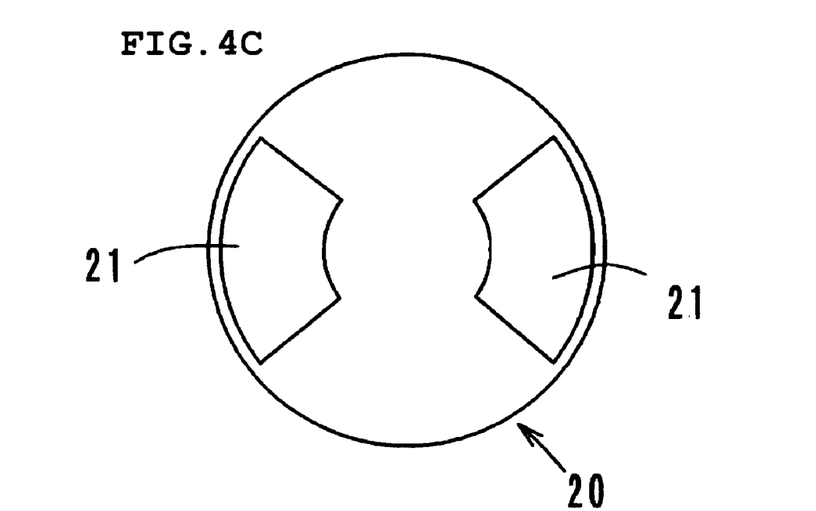
FIG. 4C is a bottom view.

With reference to FIG. 4, the rotor 20 is formed from a conductive material into a disk shape. Bumps on the bottom surface of the rotor 20, which are in contact with the stator 10, function as a rotor electrode 21 of two pieces. Additionally, a driver groove 23 is formed on the top surface of the rotor 20, which is used for rotating the rotor 20.

Figure 5:
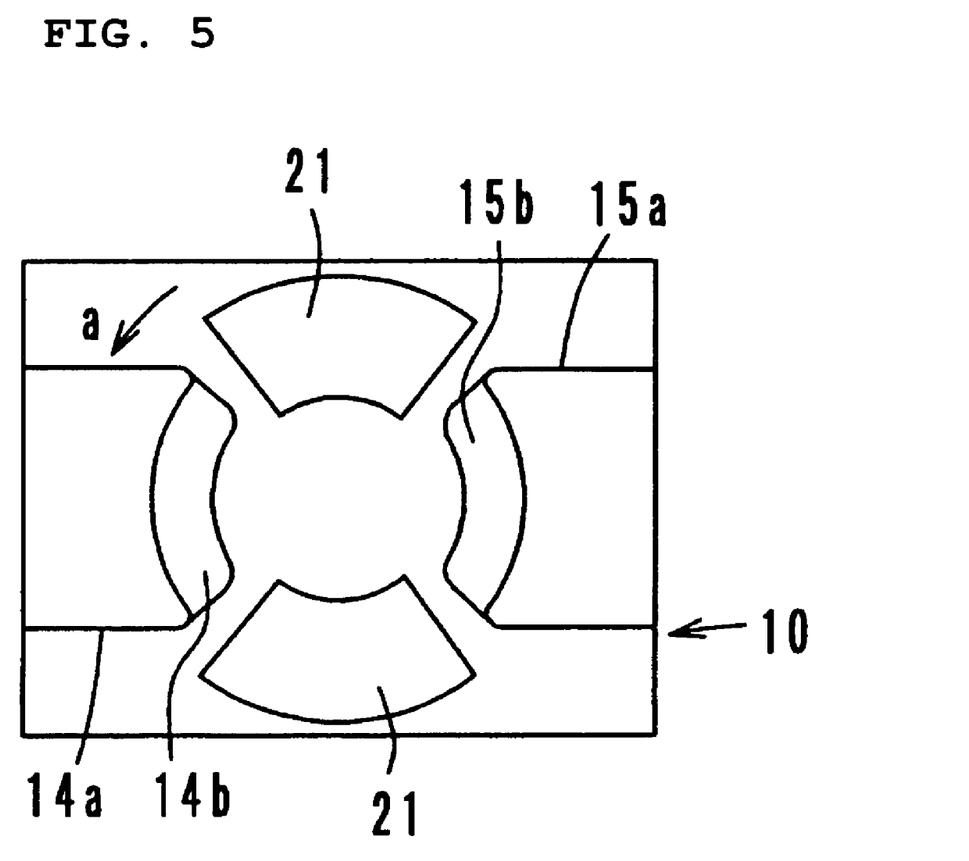
FIG. 5 is a view for explaining the relationship between a stator electrode and a rotor electrode of the variable capacitor according to the first preferred embodiment of the present invention.

Positioning of the stator electrodes 14a, 14b, 15a, and 15b and the rotor electrode 21 will now be described with reference to FIG. 5. In FIG. 5, the rotor electrode 21 does not oppose the stator electrodes 14a, 14b, 15a, and 15b, and so capacitances between the electrodes are zero. If the rotor 20 rotates, for example, in the direction shown by arrow a, the upper piece of the rotor electrode 21 opposes the stator electrodes 14a and 14b, and the lower piece of the rotor electrode 21 opposes the stator electrodes 15a and 15b. Accordingly, capacitances are generated between the opposing electrodes in proportion to the areas of overlap.

The generated capacitance is determined by setting the rotation angle of the rotor 20 to a desired value. Each area of overlap of the electrodes becomes the minimum, that is, the capacitance becomes a maximum value, and the maximum, that is, the capacitance becomes the minimum, for every 90 degree rotation of the rotor 20.

Figure 7:
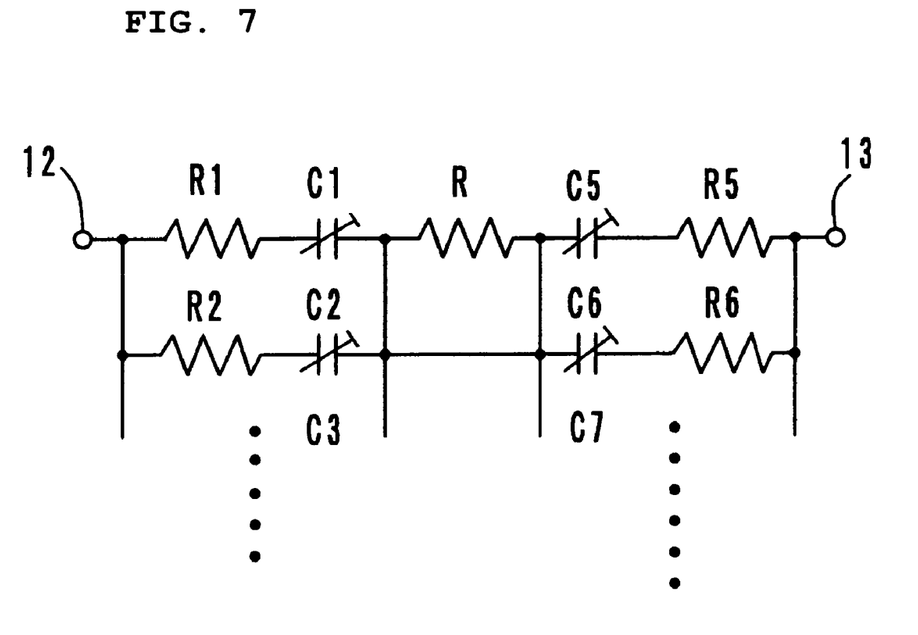
FIG. 7 is a diagram of the equivalent circuit of the variable capacitor according to a preferred embodiment of the present invention.

FIG. 7 shows the equivalent circuit of the variable capacitor. That is, the stator electrode layers 14a and 14b, and the rotor electrode 21 define the parallel-connected capacitances C1 and C2. The stator electrode layers 15a and 15b, and the rotor electrode 21 define the parallel-connected capacitances C5 and C6. In addition, the capacitances C1 and C2 are connected in series to the capacitances C5 and C6.

With reference to FIG. 7, resistive components R1 and R2 of the respective stator electrode layers 14a and 14b are connected in parallel. Also, resistive components R5 and R6 of the respective stator electrode layers 15a and 15b are connected in parallel. Consequently, the resistance (ESR) is reduced. Reference symbol R in the drawing denotes a resistive component of the two pieces of rotor electrode 21.

Additionally, since each capacitance C1, C2, C5, or C6 varies from zero to its maximum value, the overall capacitance is adjustable to an extremely small value, even to zero.

Figure 6A:
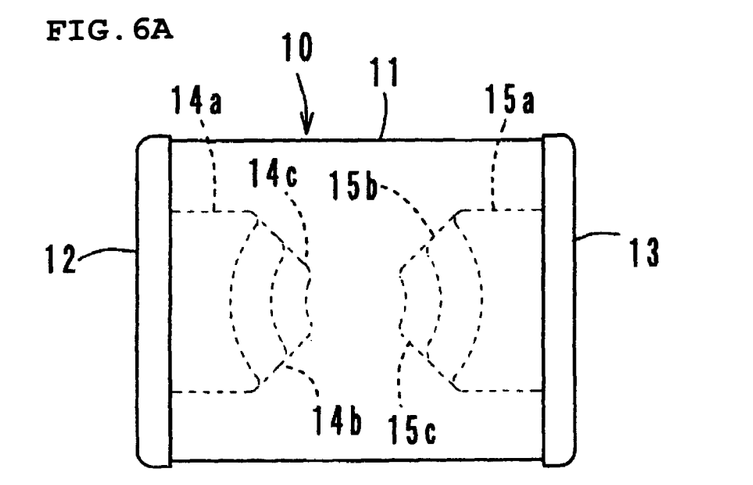
FIG. 6A is a plan view.
Figure 6B:
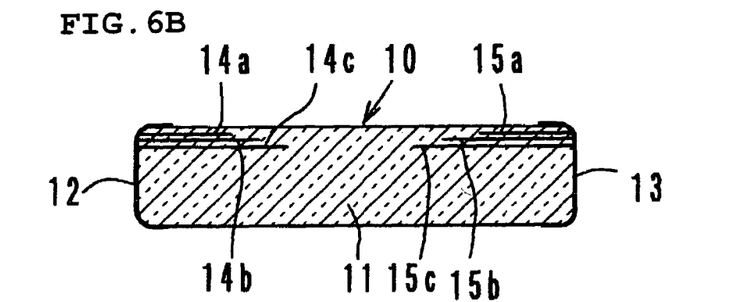
FIG. 6B is a sectional view.
Figure 6C:
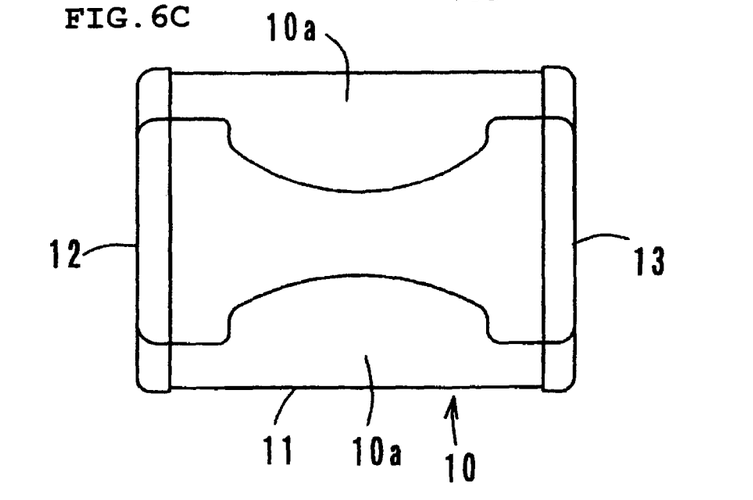
FIG. 6C is a bottom view.

Second Preferred Embodiment (FIG. 6)

A variable capacitor according to a second preferred embodiment basically includes the same components as those in the first preferred embodiment. With reference to FIG. 6, the difference is that layers 14a, 14b, and 14c of a first stator electrode and layers 15a, 15b, and 15c of a second stator electrode are disposed in three layers of the dielectric substrate 11 of the stator 10. In FIG. 6, elements and blocks identical to those illustrated and described in relation to FIG. 3 are designated by like reference numerals, and duplicated descriptions are omitted.

The equivalent circuit of the second preferred embodiment is also shown in FIG. 7. In this preferred embodiment, capacitances C3 and C7 (not shown) are added. The effects are identical to those in the above-described first preferred embodiment of the present invention.

Other Preferred Embodiments

A variable capacitor according to the present invention is not limited to the above-described preferred embodiments. Numerous and various modifications can be made without departing from the spirit of the present invention.

For example, the structures and shapes of the stator, the rotor, and the cover can be determined freely. In particular, the shapes of the stator electrode and the rotor electrode, and the number of layers of the stator electrode can be determined freely. In addition to the stator electrodes, other elements may be incorporated in the substrate of the stator.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. A variable capacitor comprising:
    a stator having a dielectric substrate;
    a first external electrode and a second external electrode disposed on the dielectric substrate;
    a first stator electrode connected to the first external electrode and a second stator electrode connected to the second external electrode in an interior of the dielectric substrate; and
    a rotor rotatably supported relative to the stator, the rotor having a rotor electrode; wherein
    each of the first and the second stator electrodes includes a plurality of conductor layers such that capacitances are defined in areas of overlap of the conductor layers and the rotor electrode.

2. The variable capacitor according to claim 1, wherein the first stator electrode and the rotor electrode define an equivalent circuit of a plurality of parallel-connected variable capacitors, the second stator electrode and the rotor electrode define an equivalent circuit of a plurality of parallel-connected variable capacitors, and the parallel-connected variable capacitors are connected in series with each other.

3. The variable capacitor according to claim 1, wherein the rotor electrode passes through positions where the area of overlap of the rotor electrode and the first and second stator electrodes alternately has a minimum value and a maximum value for every 90 degree rotation of the rotor.

4. The variable capacitor according to claim 1, wherein centers of the stator and the rotor are aligned.

5. The variable capacitor according to claim 1, further comprising a cover including an upper segment and a side segment which rotatably supports the rotor relative to the stator.

6. The variable capacitor according to claim 1, wherein the stator and the rotor are integral.

7. The variable capacitor according to claim 1, wherein each of the first and the second stator electrodes includes two conductor layers.

8. The variable capacitor according to claim 1, wherein the first and second stator electrodes include upper layers and lower layers, the lower layers having a wider area than the upper layers.

9. The variable capacitor according to claim 1, wherein rotor is made of a conductive material and has a disk shape.

10. The variable capacitor according to claim 1, wherein the rotor electrode is defined by at least one bump on a bottom surface thereof.

11. The variable capacitor according to claim 1, wherein the rotor includes a driver groove formed on a top surface thereof.

* * * * *